United States Patent [19]

Loeffler

[11] Patent Number: 4,807,493
[45] Date of Patent: Feb. 28, 1989

[54] TWIN COUNTERSHAFT TRANSMISSION WITH FLOATING MAIN SHAFT

[75] Inventor: John M. Loeffler, Toledo, Ohio
[73] Assignee: Dana Corporation, Toledo, Ohio
[21] Appl. No.: 101,065
[22] Filed: Sep. 25, 1987
[51] Int. Cl.[4] ............................. F16H 3/02; F16H 3/08
[52] U.S. Cl. ............................. 74/745; 74/331; 74/333
[58] Field of Search ................. 74/331, 333, 363, 375, 74/745

[56] References Cited

U.S. PATENT DOCUMENTS

| | | | |
|---|---|---|---|
| 1,410,445 | 3/1922 | Bailly | 74/333 |
| 1,689,180 | 10/1928 | White | 74/333 |
| 1,750,292 | 3/1930 | White | 74/333 |
| 2,329,354 | 9/1943 | McCarter | 74/333 |
| 2,637,221 | 5/1953 | Backus et al. | 74/745 |
| 3,105,395 | 10/1963 | Perkins | 74/745 |
| 3,184,984 | 5/1965 | Erdman et al. | 74/333 |
| 3,237,472 | 3/1966 | Perkins et al. | 74/331 |
| 3,283,613 | 11/1966 | Perkins | 74/745 |
| 3,335,616 | 8/1967 | Perkins | 74/331 |
| 3,500,695 | 3/1970 | Keiser | 74/331 |
| 3,581,590 | 6/1971 | Detra et al. | 74/339 |
| 3,611,823 | 10/1971 | Richards et al. | 74/331 |
| 3,620,097 | 11/1971 | Herr | 74/473 |
| 3,648,546 | 3/1972 | McNamara et al. | 74/745 |
| 3,817,123 | 6/1974 | Whately et al. | 74/331 |
| 4,034,620 | 7/1977 | McNamara et al. | 74/410 |
| 4,104,928 | 8/1978 | Vandervoort | 74/331 |
| 4,152,949 | 5/1979 | Vandervoort et al. | 74/331 |
| 4,269,077 | 5/1981 | Vandervoort | 74/331 |
| 4,375,172 | 3/1983 | Richards et al. | 74/331 |
| 4,388,838 | 6/1983 | Richards et al. | 74/331 |
| 4,388,843 | 6/1983 | Teeter | 74/745 |
| 4,669,326 | 6/1987 | Kawamoto | 74/363 |
| 4,736,643 | 4/1988 | Richards | 74/331 |

FOREIGN PATENT DOCUMENTS

| | | | |
|---|---|---|---|
| 1180919 | 1/1985 | Canada | 74/331 |
| 02333480 | 8/1987 | European Pat. Off. | 74/331 |

Primary Examiner—Leslie A. Braun
Assistant Examiner—Harold F. Macris
Attorney, Agent, or Firm—Irvin L. Groh; Alfred L. Patmore, Jr.

[57] ABSTRACT

A multi-speed twin countershaft transmission having a floating main shaft with no internal or external bearings or other support device at or adjacent its ends. The main shaft is positioned only by gears carrying the torque. At the forward end of the main shaft, positioning and support takes place by engagement of the main shaft gear to the main shaft and the two counter shaft gears driving it. Positioning and support at the output end of the main shaft is obtained by the self positioning of a range drive gear on the main shaft between two input driven gears on a pair of range countershafts. A true 50-50 torque split is obtained.

23 Claims, 2 Drawing Sheets

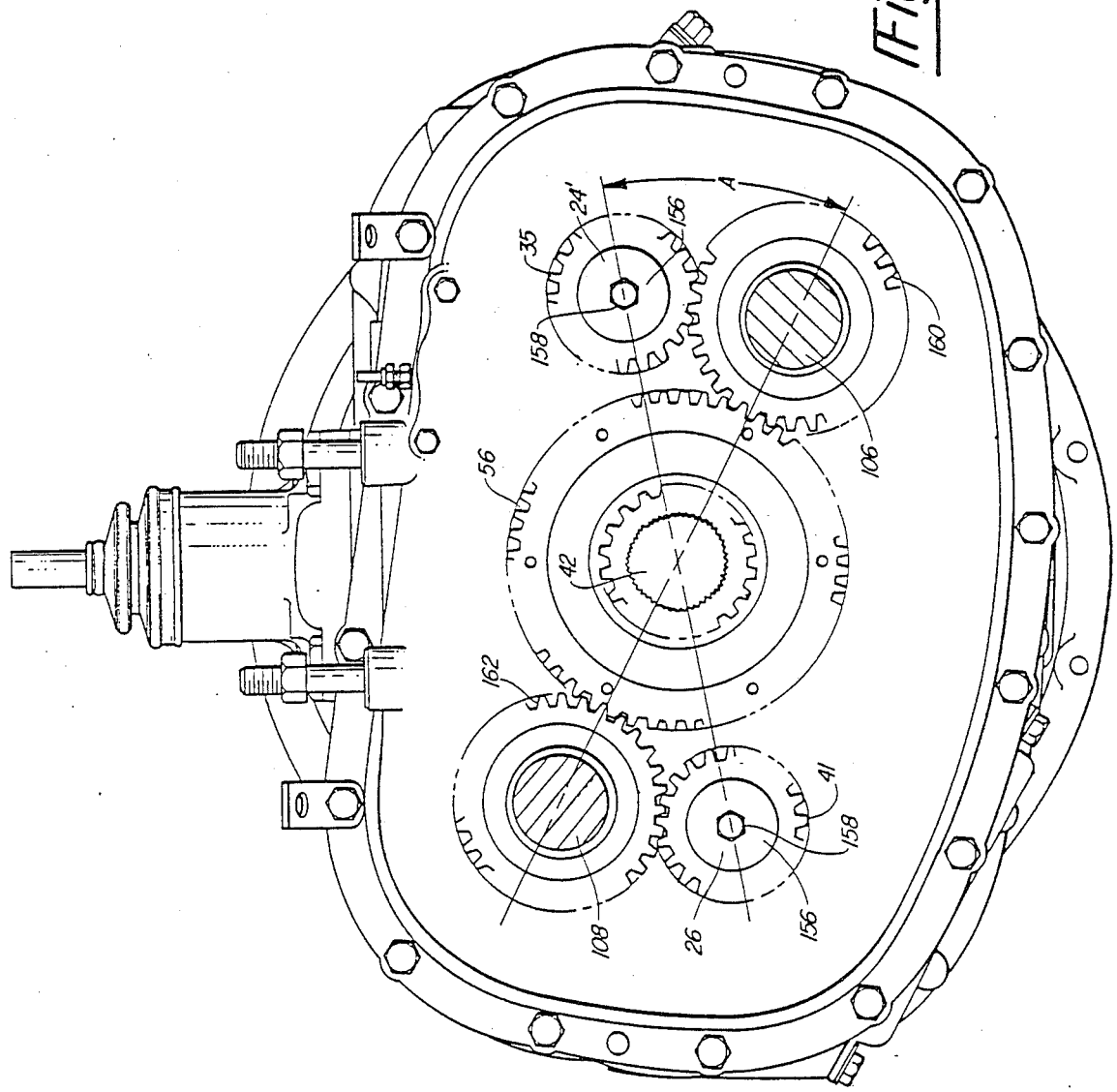

TWIN COUNTERSHAFT TRANSMISSION WITH FLOATING MAIN SHAFT

BACKGROUND OF THE INVENTION

1. Field of the Invention

This invention relates to a multi-countershaft transmission and, more particularly, to a multi-countershaft or twin countershaft transmission with a floating main shaft.

2. Description of the Prior Art

The advantages of multi-countershaft transmissions are well known as well as the disadvantages associated with them.

In multi-speed automotive transmissions carrying heavy torque loads, the single countershaft transmission becomes quite large. A multi-countershaft transmission is attractive to reduce size, carry heavier torque loads, increase gear life, and reduce costs. The primary problem associated with the use of multi-countershafts is that of insuring that the torque load is evenly divided among the countershafts. Obviously, the above purposes are thwarted if there isn't an equal division of torque. Precision machining of the transmission components, particularly the gears, shafts, and housing to guarantee equal load distribution can become cost prohibitive.

Consideration of the foregoing problems have lead to the popularity of a twin countershaft transmission. When there are only two countershafts, adjustment of the main shaft between the two countershafts will balance the torque. Thus, a floating main shaft has been touted as the answer to the problem; because, if the main shaft is truly floating, it will seek its own balance between the two countershafts. While some prior art multiple or twin countershaft transmissions have been labelled as having a floating main shaft, usually they have permitted a limited amount of movement at the input or head end of the main shaft with a decreasing mobility toward the outlet end which at best might be pivoted.

While external bearings at the input end of the main shaft have in some instances been replaced by bushings with large clearances, or by internal bearings or piloting on the input shaft, an external roller bearing has usually been retained at the output end of the main shaft.

Another early technique was to mount the main shaft in a forward and a rearward (input and output end) roller bearing held in spring loaded cradles which allows limited movement of the shaft at each end.

Commonly, the output gear of the main shaft, most commonly referred to as the range drive gear, is mounted on a bearing in the casing with the main shaft fitting inside this output gear allowing no movement. Even where the connection between the output gear and shaft is with a loosely fitting spline, for all practical purposes, the shaft is fixed because as soon as torque is applied on the spline, it sticks in a single position and does not move around or become self adjusting. With the output end of the shaft fixed in a given position because it cannot slide under torque, there cannot be a true equal torque split.

SUMMARY OF THE INVENTION

The present invention provides a twin countershaft multi-speed transmission having a completely floating main shaft with no internal or external bearings or other support structure at or adjacent its ends when the main shaft is delivering torque. The main shaft is located by means external to the shaft itself. This external locating means is the coaxially located input and output shafts at the ends of the main shaft which are fixed to the housing and become the locating shafts for the transmission.

The transmission includes a housing with a pair of spaced parallel main countershafts which are mounted for rotation within the housing in a spatially fixed position by roller bearings. Input power is supplied to the two main countershafts from an input shaft having a driving input gear in mesh with driven input gears on the countershafts. A plurality of pairs of driving gears are mounted on the main countershafts with each gear of the pair being substantially identical and in an opposing location on the two main countershafts. A floating main shaft having an input and output end is located within the housing between and parallel to the main countershafts and has its output end extending beyond the main countershafts. A plurality of driven gears are located on the main shaft, one for each pair of driving gears and are driven by the driving gears. A clutch selectively engages one of the driven gears or the input gear with the main shaft. A range drive gear is affixed to the output end of the main shaft. A pair of spaced parallel range countershafts are mounted for rotation within the housing being spatially fixed by roller bearings at each end, and each has an input gear affixed to it and aligned to be driven by the range drive gear. With this arrangement, the input end of the main shaft is self-aligned and supported by the pair of countershaft gears engaged with the main shaft gear which has been selectively clutched to the main shaft, and the output end of the main shaft is self-aligned and supported by the pair of input gears on the range countershafts being driven by the range drive gear.

With a fully floating main shaft, more variations between identical pairs of countershaft gears can be tolerated while still accomplishing equal division of the torque between the countershafts. This reduces the overall cost of the transmission.

A pair of low range driving gears are mounted on the range countershafts in opposing locations. An output shaft is spatially journalled to the housing by bearings for rotation and is located between and and parallel to the range countershafts. In a preferred embodiment, a low range driven output gear is mounted on the output shaft by a bearing for rotation and is driven by the pair of low range driving gears on the range countershafts. Since the output shaft is journalled to the housing, the output end of the main shaft is precisely located relative to the output shaft by the low range driven output gear on the output shaft which acts as a timing gear in mesh with the pair of low range driving gears on the range countershafts, and the input gears on the range countershafts are aligned and driven by the range drive gear to complete the gear train. The input end of the main shaft is located by the coaxially located input shaft, which is journalled to the housing, through the driving input gear which is affixed to the input shaft and its coaction with the pair of driven input gears fixed to the main countershafts. This locates the main shaft gears by their mesh with driving countershaft gears.

The clutch includes a number of clutch collars which are connected to the main shaft by splines so that they will rotate with the main shaft but are slidable along the main shaft for engaging a driven gear on either side of the clutch collar. The outside diameter of the end portion of the clutch collar is located within the bore on the main shaft gear when the clutch collar is in neutral, not engaging the main gear on either side of it. This arrangement provides support for the input end of the main shaft when the transmission is in neutral by the coaction of outside diameter of the clutch collar with the bore on the driven gear which acts as a bearing.

The clearance between the outside diameter at one end of one of the clutch collars and the associated bore on one of the main shaft gears can be made less than the clearance between the other clutch collar ends and their associated main shaft gear bores so that the gear with less clearance will determine the location where the inlet end of the main shaft will be supported when the transmission is in neutral. For example, the power take-off gears on the main countershafts extend farthest out from their respective countershafts so that they pick up oil from the housing sump and will apply a liberal amount of lubrication to its adjacent gear. The minimum clearance between the outside diameter of the clutch collar and the bore of the main shaft gear can be established at this adjacent gear to take advantage of the additional lubrication provided by the power take-off gear.

To effect engagement of the clutch collars with the main shaft gears, the clutch collars are provided with external splines which engage internal splines on the main shaft gears. In a preferred embodiment of this invention, the splines have a reverse taper so that as the clutch collar is shifted into engagement with a selected main shaft gear, the clutch collar will be drawn into the driven gear. An abrupt change in the diameter of the internal spline in each of the main shaft gears establishes stops against which the clutch collars are drawn.

The driving input gear on the input shaft is internally splined with a cylindrical recess portion starting at the rear face of the gear. This input gear overhangs the end of the input shaft so that the input end of the splined main shaft extends into the gear with a clutch collar for bearing support in neutral and engagement of the input shaft directly to the main shaft.

In a preferred form of the invention, the main shaft is axially located within the housing by means that is associated with the range countershaft. This means includes thrust rings surrounding the main shaft and abutting both sides of the range drive gear with the thrust ring on the input side of the range drive gear being restrained against movement toward the input end of the main shaft and the thrust ring on the output side of the range drive gear being restrained against movement toward the output end of the main shaft. These thrust rings extend radially outward from the main shaft into engagement with the sides of the input gears which are affixed to the range countershafts. With the range countershafts being fixed relative to the housing, this establishes the axial location of the main shaft.

In another preferred embodiment of the invention, the main shaft driven gears are located entirely by the countershaft gears they mate with. This eliminates internal thrust washers attached to the main shaft and attached under the main shaft gears which have a poor supply of lubrication at the points where there is a large relative velocity differential between the thrust washers mounted under the main shaft gears and the thrust washers mounted on the main shaft. The gear mesh provides the radial location, and thrust rings surrounding the main countershafts contact the sides of the fixed driving gears on the countershafts and the faces of the main shaft gears on the main shaft at least in the area of mesh to provide axial location of the main gears. The locations of the thrust rings around the main countershafts guarantees a good supply of lubrication in the contact area, and minimum wear is experienced since at the point of contact between the thrust rings and the main shaft gears there is very little relative velocity difference. At the pitch diameter there is no relative velocity difference.

DRAWINGS

The preferred embodiments of the invention are illustrated in the drawing in which:

FIG. 2 is a section taken on line 2—2 of FIG. 1.

FIG. 3 is an enlargement of the encircled area 3 in FIG. 2.

DETAILED DESCRIPTION OF PRESENTLY PREFERRED EMBODIMENTS OF THE INVENTION

General Description, Main Section

Figure 1:
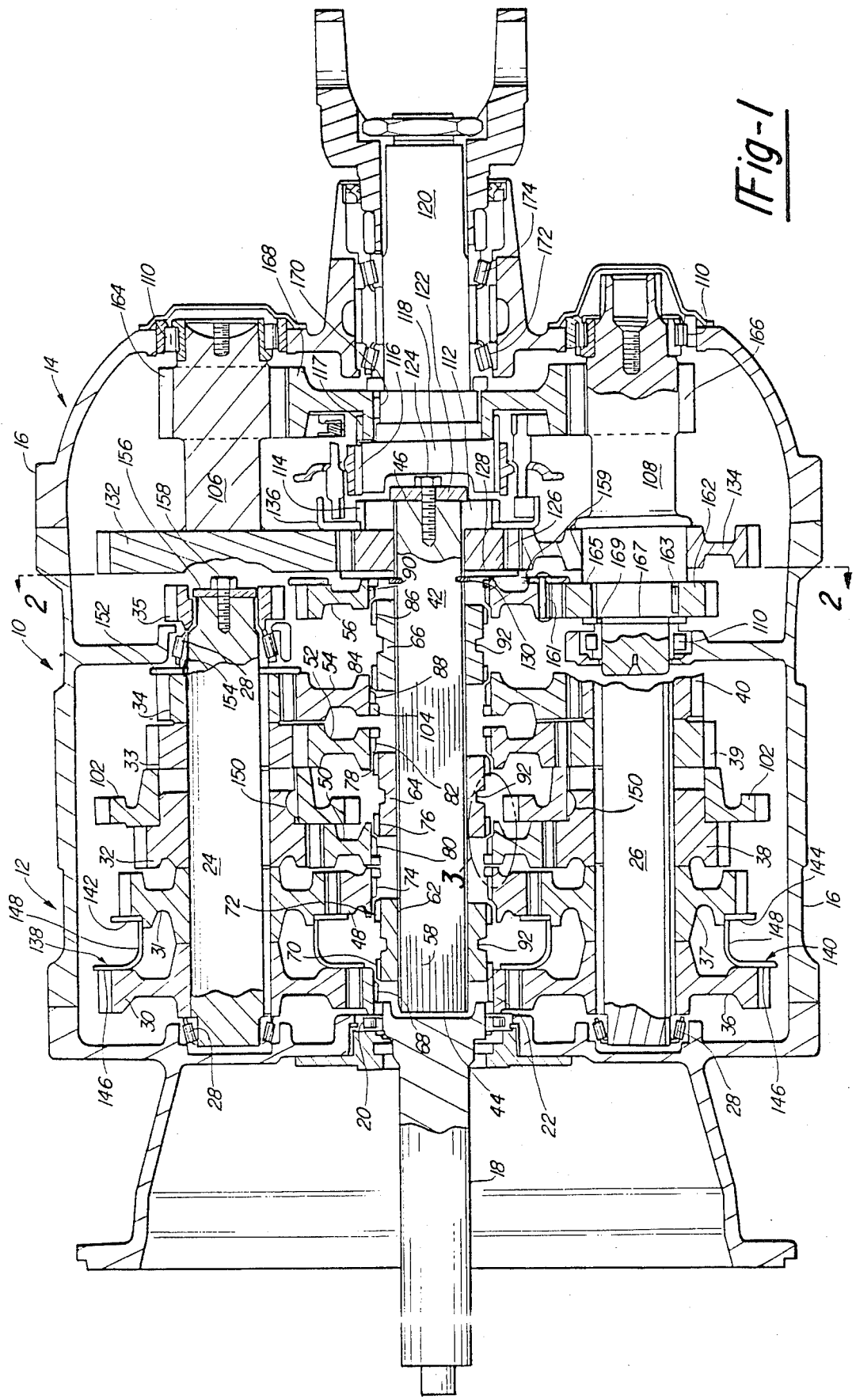
FIG. 1 is a horizontal section of the transmission embodying the invention in which portions are broken away to show the relationship of the main countershafts with the range countershafts.

The horizontal sectional view of the transmission as presented in FIG. 1 shows the input or head end of the transmission to the left and the output or rear end of the transmission to the right, and reference to the components of the transmission will be made in these terms. The multi-speed, multi-countershaft transmission 10 of this invention is shown as a twin countershaft transmission having a main section 12 and a range section 14 with a housing or casing structure 16 which can be end loaded for ease in assembly. The housing 16 is shown as a three part unitary structure with parital dividing walls for bearing supports, but independent housings could be used for the main section and range section.

Input shaft 18 is suitably journalled in housing 16 by roller bearing 20 and carries input driving gear 22 which is rigidly attached to the input shaft 18 by splines, or it could be integrally formed with the input shaft.

Parallel countershafts 24 and 26 are mounted for rotation within housing 16 being spacially fixed to the housing by tapered roller bearings 28 at each end of the countershaft. The full length of countershaft 24 is shown in FIG. 1, but the rear end of countershaft 26 is broken away to show the full length of a range countershaft to be discussed later.

The tapered roller bearings 28 at both ends of each countershaft 24 and 26 are take-apart bearings so that they may be pressed into position which is less likely to cause bearing damage than alternatively using permanently assembled bearings which are assembled by impacting blows on the bearings or by requiring special fixturing to press the bearings in position.

Countershaft 24 carries ratio gears 30 31, 32, 33, 34, and 35 which are fixed to the countershaft for rotation with it. Countershaft gear 30 is a driven input gear. Countershaft gears 31, 32, 33, and 34 are forward driving gears, and countershaft gear 35 is a reverse driving gear.

Countershaft 26 has ratio gears 36, 37, 38, 39, 40, and 41 fixed to countershaft for rotation with it. Gears 36–41 are substantially identical to gears 30–35 respectively, with gear 36 being a driven input gear, gears 37, 38, 39, and 40 being forward driving gears and gear 41 being a reverse driving gear. Gear 41 is only seen in FIG. 2 because of the cut away in FIG. 1.

Floating main shaft 42 having an input end 44 and an output end 46 is located within the housing 16 between and parallel to the countershafts 24 and 26 and is generally aligned or coaxial with input shaft 18. Main shaft gears 48, 50, 52, and 54 surround main shaft 42 and are driven and supported by corresponding countershaft ratio gears. Main shaft gear 48 meshes with and is supported by countershaft gears 31 and 37; main shaft gear 50 meshes and is supported by countershaft gears 32 and 38; main shaft gear 52 meshes with and is supported by countershaft gears 33 and 39; and main shaft gear 54 meshes with and is supported by countershaft gears 34 and 40. Main shaft gear 56 is a reverse gear and is supported by reverse idler gears as will be explained later.

Engagement of Main Shaft Gears and Support of Forward End of Main Shaft

Main shaft 42 has external splines 58 which engage corresponding internal splines on clutch collars 62, 64, and 66 for rotation of the clutch collars with the main shaft. The clutch collars have external splines which drivingly engage internal splines in the main shaft gears. Input gear 22 also has an internal spline 68 which is engageable by external spline 70 on clutch collar 62 for direct drive of the main shaft from the input shaft. External spline 72 on the other end of clutch collar 62 is selectively engageable with internal spline 74 on main shaft gear 48. Likewise clutch collar 64 has external splines 76 and 78 at its opposite ends which are selectively engageable with internal splines 80 of main shaft gear 50 and internal spline 82 of main shaft gear 52. Similarly clutch collar 66 has external splines 84 and 86 at its opposite ends which are selectively engageable with internal splines 88 on main shaft gear 54 and internal spline 90 on main shaft gear 56.

Selective engagement of only one of the clutch collars 62, 64 and 66 at any one time with their adjacent main shaft or input gear shaft is effected by the conventional use of shift fork levers (not shown) which engage in grooves 92 on the clutch collars. Thus, main shaft 42 is driven from input shaft 18 having input driving gear 22 rigidly attached to drive meshing driven input gears 30 and 26 rotating countershafts 24 and 26, and their respective countershaft gears and meshing main shaft gears, by the main shaft gear which has been engaged to the main shaft by one of clutch collars 62, 64 and 66. With no bearing or other radial restraint, the engaged main gear will seek its own center between the two countershaft gears with which it is in mesh, distributing the torque load at the input end of the main shaft in an even, 50-50, manner between the two countershafts.

Neutral Condition Support of Forward End of Main Shaft

As shown in FIG. 3, which is an enlargement of a portion of main shaft gear 50 and its associated clutch collar 64, the internal spline 80 on main shaft gear 50 commences with a chamfered surface 94 recessed in from the rear face 96 of the gear 50 which faces adjacent clutch collar 64. External spline 76 on clutch collar 64 commences with a chamfered surface 98 to facilitate engagement with the chamfered surface 94 on the internal spline 80 of main gear 50. Engagement of the main gear 50 to the main shaft 42 is accomplished when the collar is moved leftward or toward the input end of the main shaft.

The outside diameter of the clutch collar 64, that is, the outside diameter of external spline 76, extends inside the bore of main gear 50 creating the bearing area 100 in the recess of the bore when the transmission is in neutral with all of the clutch collars being disengaged from their adjacent main gears. This overlapping of the outside diameter of the clutch collar with the bore in the main shaft gear or input gear occurs for each clutch collar 62, 64, and 66 and their associated gears 22 and 48, 50 and 52, 54 and 56, respectively. The spacing between spline teeth on the clutch collars, that is the spacing between spline teeth 70, 72, 74, 76, 84, 86, acts as lubrication passages for oil to be supplied to the recess bearing area.

The clearance between the outside diameter of the clutch collar spline and the bore in the main gear can be reduced at any particular point such as the clearance 'c' between external spline 76 on clutch collar 64 and internal bore bearing area 100 in the recess on main gear 50 so that the input shaft is supported at that particular point when the transmission is in neutral. In the embodiment of the transmission shown in FIG. 1, the power take-off gears 102 are adjacent to main shaft gear 50. The large diameter of the power take-off gears 102 dip them deep into the oil sump of the transmission housing providing an abundant spray of oil on gear 50 and its overlapping clutch collar and main gear bearing area 100 for supporting the forward end of the main shaft when the transmission is in neutral.

Positive Clutch Collar Engagement

In the preferred embodiment of this invention, the splines on the clutch collars and main gears have a reverse taper so that as soon as a clutch collar is engaged with a main gear it will continue to draw the clutch collar into the main gear. The diameter of the spline teeth on the main gear is abruptly decreased at the desired point of maximum penetration of the clutch collar to act as a stop for the clutch collar. This is shown at 104 on main gear 50 in FIG. 3. The reverse taper is conventional in that the width of the spline teeth are at a maximum at the beginning chamfered surface 98 and decrease in width towards the center of the clutch collar with the corresponding configuration of the main gear splines so that the greatest backlash will occur in the fully engaged position of the clutch collar in the main gear.

Axial Location of Gears on Main Shaft

At the rear end of the main section 12 high range output clutch gear 112 is internally splined to main shaft 42. End washer 122 and bolt 124 restrains rearward movement of the clutch gear 112. Range drive gear 126 abuts against the input side of high range clutch 112. Thrust plate 128 in the form of a large diameter steel plate acts against the input end face of range drive gear 126, and thrust plate 128 is restrained from movement toward the input end by snap ring 130. Synchronizer cup 136 is trapped between high range clutch gear 112 and range drive gear 126 in a recess in the high range clutch gear itself.

Main shaft gears 48, 50, 52, and 54 are continually rotating through their mesh with the associated countershaft ratio gears but are not in contact with the main shaft 42 until they are engaged by their respective clutch collars as previously described. They are also free to move longitudinally along the main shaft 42 within their tolerance limits allowed by the respective thrust rings or plates.

Conventionally main shaft gears are restrained by thrust rings and snap rings located underneath the gears which causes a lubrication problem which is only partially solved by allowing more space between adjacent gears. With each of the main shaft gears operating at a different speed, a good amount of frictional heat and wear occurs here. The disadvantages associated with this type of positioning of the main gears is obviated in the present transmission.

The foregoing means for axially locating the driven main shaft gears include thrust rings which extend around the main countershafts in contact with the faces of the driving gears on the countershafts and their associated driven gear on the main shaft.

The thrust rings include thrust rings 138 and 140 surrounding countershafts 24 and 26 respectively which abut against the rear faces of countershaft input gears 30 and 36 and input driving gear 22 on input shaft 18. Thrust rings 142 and 144 surrounding countershafts 24 and 26 abut against the input faces of countershaft gears 31 and 37 and their meshing main shaft gear 48. The cooperation of thrust rings or collars 138 and 142 and the cooperation of thrust rings 140 and 144 establishes the spacing between the input gear 22 and the driven main shaft gear 48.

The thrust rings 138 and 140 are in the form of collars each having a radially extending annular portion 146 and a cylindrical axial extending portion 148. It will be appreciated that thrust rings 138 and 140 can be made from two separate parts, namely a separate axially extending and a separate radially extending portion or that the thrust rings 138 and 140 can be made as a unitary U-shaped thrust collar eliminating the need for separate thrust rings 142 and 144.

Main shaft gears 48 and 50 have abutting faces as does their meshing driving countershaft gears 31, 32, and 37, 38. Movement of main shaft gear 50 toward the output end is restricted by thrust rings 102 which take the form of power take-off gears on the countershafts 24 and 26. If power take-off gears were not offered as part of the transmission, thrust rings similar to 138, 142,and 140, 144 would be utilized in their place, and countershaft gears 38 and 39 would be moved into contact, and countershaft gears 32 and 33 would be moved into contact for gear stack-up. The power take-off gears 102 in this case are keyed by woodruff keys 150 to countershaft ratio gears 32 and 38 and thus are stationary with respect to those gears.

The output faces of power take-off gears 102 abut against the input faces of driving countershaft ratio gears 33 and 39 and main shaft gear 52 to establish the spacing between main shaft gears 50 and 52.

Main shaft gears 52 and 54 have abutting faces as do their meshing driving countershaft gears 33 and 34 on countershaft 24 and driving gears 39 and 40 on countershaft 26. Thrust rings 152 seating against shoulders 154 on countershafts 24 and 26 (only visible in FIG. 1 on countershaft 24) press against the output side of countershaft gears 34 and 40 and extend radially down to position main shaft driven gears 52 and 54 by contact with the rear face of main gear 54. Thrust rings 152 are held in position by tapered roller bearings 28 at the back or output end of the countershafts.

Reverse gears 35 and 41 are held against rearward movement on countershafts 24 and 26 respectively by washers 156 and bolts 158 attached to the output face of countershafts 24 and 26. Reverse gears 35 and 41 abut against tapered roller bearings 28 to restrict movement toward the input end on the countershafts 24 and 26.

Main shaft reverse gear 56 has a thrust ring 159 attached to its rear face by rivets 161 which extends radially outward to engage the rear side of reverse idler gears 160 and 162 on range countershafts 106 and 108 thereby restricting movement of main shaft reverse gear 56 toward the input end. The hub of main shaft reverse gear 56 abuts against thrust plate 128 restricting movement of main shaft reverse gear 56 toward the output end.

General Description - Range Section

In the range section 14 of the transmission, a pair of spaced parallel range countershafts 106 and 108 are mounted to the housing 16 by roller bearings 110 located at each end of the range countershafts to spatially fix them for rotation therein.

The range countershafts 106 and 108 overlap the main countershafts 24 and 26 as shown in FIG. 1 by the breakaway sections wherein the full length of main countershaft 24 is shown, and the full lentgh of range countershaft 108 is shown. This overlap can be depicted by the angle "A" between the plane containing the main countershafts and the plane containing the range countershafts as shown in FIG. 2.

Range countershaft input gears 132 and 134 are keyed or welded to range countershafts 106 and 108 and are in meshing engagement with the range drive gear 126 on main shaft.

Low range driving gears 164 and 166 are rigidly mounted or formed integrally with range countershafts 106 and 108.

The output shaft 120 is spatially fixed for rotation to housing 16 by tapered roller bearings 172 and 174. Output shaft 120 carries low range output gear 168 mounted thereon by needle bearing 170, and low range output gear 168 is in constant mesh with low range driving gears 164 and 166. Output shaft 120 is externally splined to cooperate with internal splines on range clutch collar 118 for rotation of the clutch collar with the output shaft. Clutch collar 118 has splines 116 for selective engagement with external splines 114 on high range output clutch gear 112 when the clutch collar is moved to the left toward the input end or engagement with splines 117 on low range output gear 168 when the clutch collar is moved to the right toward the output end.

Engagement of the high range output gear 112 directly connects main shaft 42 with output shaft 120 for higher speeds, and engagement of low range output gear 168 drives the output shaft through range drive gear 126 on the main shaft, range countershaft input gears 132 and 134 and low range driving gears 164 and 166 on range countershafts 106 and 108 for lower speeds.

Roller bearings 110 at each end of the range countershafts like tapered roller bearing 28 are also take-apart bearings for ease in assembly and less possibility of assembly damage.

Axial Location of Main Shaft

Thrust ring 128 acts against the head end or input end face of range gears 132 and 134 as well as the input face of the low range output gear 126. Sychronizer cup 136 trapped between high range clutch gear 112 and low range output gear 126 extends radially outward to abut against the output side of range input gears 132 and 134 as well as the output face of low range output gear 126. Thus, the axial position of main shaft 42 is determined from means associated with the range countershafts, and that means includes thrust ring 128 and synchronizer cup 136.

Support of Output End of Main Shaft

The output end of the main shaft is not supported in the customary manner by a roller bearing but is externally supported in a line by input range countershaft gears 132 and 134 as they are being driven by the range drive gear 126.

The low range driven output gear 168 being held on the journalled output shaft 120 by a bearing 170 keeps the gear teeth of range countershaft low range driving gears 164 and 166 on range countershafts 106 and 108 in proper meshed relationship. As is required in any multiple countershaft transmission design, input gear 134 and low range driving gear 166 on range countershaft 108, as well as input gear 132 and low range driving gear 164 on range countershaft 106 are assembled with the gear teeth aligned. The range countershaft input gears 132 and 134 in turn align and support the range drive gear 126 locating the output end of the floating main shaft 42. This provides an equal torque split while allowing for machining tolerances.

With the input end of the main shaft being self aligned and supported by the pair of countershaft gears meshing with the selectively clutched main shaft gear, a true 50-50 torque split is accomplished between the two main countershafts. The full floating main shaft 42 is positioned by movement between the two countershafts 24 and 26 only by gears carrying the torque.

Reverse Idler Gear Location

The unique location of the reverse idler gears on the range countershafts are the subject of my co-pending patent application entitled "Twin Countershaft Transmission", filed concurrently herewith.

As best shown in the lower right hand corner of FIG. 1 as to the mounting of reverse idler gear 162 on countershaft 108, reverse idler gears 160 and 162 are mounted on countershafts 106 and 108 respectively on needle bearings 163. They are held against movement toward the output end by shoulders 165 on the countershafts and against movement toward the input end by rings 167 afixed to the countershafts 106 and 108 for rotation therewith by pin 169.

The spacing between the planes containing the range countershafts and the plane containing the main countershafts has been selected so that reverse idler gears 160 and 162 can mesh with reverse driving gears 35 and 41 on countershafts 24 and 26. As seen in FIG. 2, this can be depicted as an angle "A" between the plane containing the range countershafts and a plane containing the main countershafts. Main shaft reverse gear 56 is continually driven by its engagement with the reverse idler gears 160 and 162 on range countershafts 106 and 108 which in turn are driven by driving ratio gears 35 and 41 on countershafts 24 and 26. This eliminates the need for independent reverse idler gear shafts with a corresponding savings in space and cost.

The embodiments of the invention in which an exclusive property or privilege is claimed are defined as follows:

1. A multi-speed transmission comprising, in combination:

a housing;
a pair of spaced parallel main countershafts mounted for rotation within said housing and being spatially fixed therein;
means for supplying input power to both of said main countershafts;
a plurality of pairs of driving gears mounted on said main countershafts, each gear of a pair being substantially identical and positioned on a respective one of said main countershafts at axially aligned locations along a floating mainshaft;
said floating main shaft having input and output ends, said main shaft being located within said housing between and parallel to said main countershafts and having its output end extending beyond said main countershafts with no internal or external bearings or other support at or adjacent its ends under torque delivering conditions;
a plurality of driven gears located on said main shaft, each in mesh with a pair of said driving main countershaft gears;
means for selectively clutching one of said driven gears into driving relationship with said main shaft;
a range drive gear affixed at the output end of said main shaft;
a pair of spaced parallel range countershafts mounted for rotation within said housing and being spatially fixed therein; and
a pair of input gears affixed to said range countershafts in engagement with said range drive gear;
whereby under torque delivering conditions the input end of said main shaft is self-aligned and totally supported by the pair main countershaft driving gears driving the main shaft driven gear which has been selectively clutched to said main shaft, and the output end of said main shaft is self-aligned and totally supported by the pair of input gears on said range countershafts being driven by said range drive gear.

2. The transmission according to claim 1 wherein the means for selectively clutching includes a clutch collar affixed to said main shaft for rotation therewith and slidable along said main shaft for engaging a selected one of said driven gears, the outside diameter of an end portion of said clutch collar being inside a bore on one of said driven gears when said clutching means is in neutral not engaging a selected gear to said main shaft;
whereby when said transmission is in neutral, the input end of said main shaft is supported by the coaction of the outside diameter of said clutch collar with the bore on a driven gear acting as a bearing.

3. The transmission according to claim 2 wherein the clutching means includes a plurality of clutch collars each end of which has an outside diameter within a bore on one of said driven gears when said clutching means is in neutral;
whereby when said transmission is in neutral, the input end of said main shaft can be supported at a plurality of points by the coaction of the outside diameters of the end portions of said clutch collars with a plurality of the bores of said driven gears acting as bearings.

4. The transmission according to claim 3 wherein the clearance between the outside diameter at one end of one of said clutch collars and the associated bore on one of said driven gears is less than the clearance between others of said clutch collar ends and the driven gear bores so that said one end with less clearance will determine the location where the inlet end of said main shaft will be supported when the transmission is in neutral.

5. The transmission according to claim 1 wherein said range countershafts are spatially affixed by bearings to said housing for rotation therein and further including:
   a pair of low range driving gears mounted on said range countershafts, each gear of the pair being substantially identical and in opposing locations on each range countershaft;
   an output shaft spatially journalled to said housing by bearings for rotation and being located between and parallel to said range countershafts;
   a low range driven output gear mounted on said output shaft by a bearing for rotation and being driven by said pair of low range driving gears;
   whereby said low range driven output gear, being located on center by said journalled output shaft and being located on said output shaft by a bearing and being in mesh with said pair of low range driving gears on said range countershafts, and said input gears on said range countershafts being aligned with the range drive gear radially locates the output end of said main shaft.

6. The transmission according to claim 5 wherein said mans for supplying input power includes:
   an input shaft journalled to said housing;
   a driving input gear affixed to said input shaft;
   a pair of driven input gears affixed to said main countershafts and being driven by said driving input gear;
   whereby said driving input gear being located on center by said journalled input shaft and being in mesh with said pair of driven input gears angularly locates the driving gears on said countershafts and, hence, locates the input end of said mains shaft through engagement of the pair of countershaft driving gears with the main shaft driven gear which has been selectively clutched to said main shaft.

7. The transmission according to claim 6 wherein the means for selectively clutching includes a plurality of clutch collars affixed to said main shaft for rotation therewith and slidable along said main shaft to engage one of the driving input gear and the driven main shaft gears selectively to the main shaft, the outside diameter of an end portion of at least one of said collars being inside of a bore in one of said driving input gear and driven main shaft gears; whereby when said transmission is in neutral, the input end of said main shaft is supported by the coaction of the outside diameter of one of said clutch collars with at least one of the bores on said driving input gear and driven main shaft gears acting as a bearing.

8. The transmission according to claim 1 wherein the means for selectively clutching includes a plurality of clutch collars affixed to said main shaft for rotation therewith and slidable along said main shaft for engaging a selected one of said driven gears, said engagement being effected between external splines on said clutch collars and internal splines on said driven gears, said splines having a reverse taper so that as a clutch collar is shifted into engagement with a selected driven gear, the clutch collar will be drawn into said driven gear, and further including an abrupt change in the diameter of the internal spline in the driven gears which establishes stops against which the clutch collars are drawn.

9. The transmission according to claim 1 wherein said main shaft is axially located within said housing by means associated with said range countershafts.

10. The transmission according to claim 9 wherein said means for axially locating said main shaft in said housing includes thrust rings abutting both sides of said range drive gear, the thrust ring on the input side of said range drive gear being restrained against movement toward the input end of said main shaft and the thrust ring on the output side of said range drive gear being restrained against movement toward the output end of said main shaft, said thrust rings extending radially outward from said main shaft into engagement with the sides of said input gears affixed to said range countershafts.

11. The transmission according to claim 10 wherein the thrust ring on the output side of the range drive gear also serves as a synchronizer cup.

12. The transmission according to claim 1 wherein said plurality of driven gears on said main shaft are axially located relative to each other by means associated with said main countershafts.

13. The transmission according to claim 12 wherein said means for axially located said driven gears on said main shaft include thrust rings extending around said main countershafts in contact with the faces of said driving gears and their associated driven gears on said main shaft.

14. The transmission according to claim 13 wherein said thrust rings include a power take-off gear located on each main countershaft and acting radially against the faces of two adjacent driving gears and their associated driven gears.

15. A multi-speed transmission comprising, in combination:
   a housing;
   a pair of spaced parallel main countershafts mounted for rotation within said housing and being spatially fixed therein;
   a plurality of pairs of countershaft gears mounted on said main countershafts, each gear of a pair being substantially identical and positioned on a respective one of said countershafts at axially aligned locations along a floating main shaft;
   said floating main shaft having input and output ends, and said main shaft being located within said housing between and parallel to said main countershafts and having its output end extending beyond said main countershafts with no internal or external bearings or other support at or adjacent its ends under torque delivering conditions;
   a plurality of gears located on said main shaft in mesh with and being driven by said pairs of countershaft gears;
   an input shaft spatially fixed for rotation coaxial to said main shaft;
   a driving input gear affixed to said input shaft in mesh with and driving a pair of said countershaft gears;
   means for clutching one of the gears on said main shaft and said input shaft selectively into driving relationship with said main shaft;
   a range drive gear affixed to said main shaft;
   a pair of spaced parallel range countershafts mounted for rotation within said housing and being spatially fixed therein; and
   a pair of input gears affixed to said range countershafts in engagement with said range drive gear;

whereby the input end of said main shaft is self-aligned and is selectively supported by one of the input shaft selectively clutched directly to said main shaft and a pair of countershaft gears on the main shaft which has been selectively clutched to said main shaft, and the output end of said main shaft is self-aligned and supported by the pair of input gears on said range countershafts being driven by said range drive gear.

16. The transmission according to claim 15 wherein the means for selectively clutching includes a plurality of clutch collars affixed to said main shaft for rotation therewith and slidable along said main shaft for engaging a one the driving input gear and the gears on the main shaft selectively, the outside diameter of an end portion of at least one of said clutch collars being inside a bore of a driven gear on the main shaft when said clutching means is in neutral not engaging a selected gear to said main shaft;

whereby when said transmission is in neutral, the input end of said main shaft is supported by the coaction of the outside diameter of a clutch collar with the bore of a gear on the main shaft acting as a bearing.

17. The transmission according to claim 16 wherein both ends of at least one of said clutch collars have an outside diameter within bores of gears on the main shaft when said clutching means is in neutral;

whereby when said transmission is in neutral, the input end of said main shaft can be supported at a plurality of points by the coaction of the outside diameters of the end portions of said clutch collars with a plurality of the bores in the gears on said main shaft acting as bearings.

18. The transmission according to claim 17 wherein the driving input gear on said input shaft has a bore into which an end portion of one of said clutch collars is received so that it can act as a bearing when said transmission is in neutral and for selective engagement of said input shaft with said main shaft.

19. The transmission according to claim 18 wherein the clearance between the outside diameter at one end of one of said clutch collars and the bore on one of the input gear and gears on the main shaft is less than others of said clutch collars and bores so that said one end with less clearance will determine the location where the inlet end of said main shaft will be supported when the transmission is in neutral.

20. A multi-speed transmission comprising, in combination:
a housing;
a pair of spaced parallel main countershafts mounted for rotation within said housing and being spatially fixed therein;
means for supplying input power to both of said main countershafts;
a plurality of pairs of driving gears mounted on said main countershafts, each gear of a pair being substantially identical and positioned on a respective one of said main countershafts at axially aligned locations along a floating main shaft;
said floating main shaft having input and output ends, and said main shaft being located within said housing between and parallel to said main countershafts and having its output end extending beyond said main countershafts with no internal or external bearings or other support at or adjacent its ends under torque delivering conditions;
a plurality of driven gears located on said main shaft, each in mesh with a pair of said driving main countershaft gears;
means for selectively clutching one of said driven gears into driving relationship with said main shaft;
a range drive gear affixed at the output end of said main shaft;
a pair of spaced parallel range countershafts mounted for rotation within said housing and being spatially fixed therein;
a pair of input gears affixed to said range countershafts in mesh to be driven by said range drive gear; and
thrust rings abutting both sides of said input gears on said range countershafts and both sides of said range drive gear in the area of their mesh;
whereby the main shaft is axially located by said thrust rings acting against the fixed input gears on the spatially fixed range countershafts.

21. The transmission according to claim 20 wherein said thrust rings surround said main shaft and the thrust ring on the input side of said range drive gear being restrained against movement toward the input end of said main shaft and the thrust ring on the output side of said range drive gear being restrained against movement toward the output end of said main shaft, said thrust rings extending radially outward from said main shaft into engagement with the sides of said input gears affixed to said range countershafts at least through the area of mesh.

22. In a multi-speed transmission comprising in combination:
a housing;
a pair of spaced parallel main countershafts mounted for rotation within said housing and being spatially fixed therein;
means for supplying input power to both of said countershafts;
a plurality of pairs driving gears mounted on said main countershafts, each gear of a pair being substantially identical and positioned on a respective one of said main countershafts at axially aligned locations along a floating main shaft;
said floating main shaft having an input and output end located within said housing between and parallel to said main countershafts and having its output end extending beyond said main countershafts with no internal or external bearings or other support at or adjacent its ends under torque delivering conditions;
a plurality of driven gears located on said main shaft, each in mesh with a pair of said driving main countershaft gears;
means for selectively clutching one of said driven gears into driving relationship with said main shaft;
a range drive gear affixed at the output end of said main shaft;
a pair of spaced parallel range countershafts mounted for rotation within said housing and being spatially fixed therein; and
a pair of input gears affixed to said range countershafts in mesh and driven by said range drive gear; and
a plurality of thrust rings extending around said main countershafts in contact with and free to move with respect to the faces of said driving gears on the main countershafts and their associated driven gears on said main shaft;

whereby the main shaft driven gears are axially located on the main shaft from the position of said countershaft gears through said thrust rings.

23. A multi-speed transmission comprising, in combination:

a housing;

at least two spaced main countershafts having parallel axes mounted for rotation within said housing and being spatially fixed therein;

means for supplying input power to said main countershafts;

a plurality of groups of driving gears mounted on said main countershafts, each group being comprised of substantially identical countershaft driving gears in axially aligned locations along a floating main shaft and said countershafts being equally radially spaced spaced about said floating main shaft;

said floating main shaft having input and output ends, and said main shaft being located within said housing parallel to said main countershafts and having its output end extending beyond said main countershafts with no internal or external bearings or other support at or adjacent its ends under torque delivering conditions;

a plurality of driven gears located on said main shaft, in mesh with a group of said driving main countershaft gears;

means for selectively clutching one of said driven gears into driving relationship with said main shaft;

a range drive gear affixed at the output end of said main shaft;

at least two spaced range countershafts having parallel axes mounted for rotation within said housing and being spatially fixed therein; and a group of input gears one input gear of the group being affixed to each range countershaft in engagement with said range drive gear;

whereby under torque delivering conditions the input end of said main shaft is is self-aligned and totally supported by the group of main countershaft driving gears driving the main shaft driven gear which has been selectively clutched to said main shaft, and the output end of said main shaft is self-aligned and totally supported by the pair of input gears on said range countershafts being driven by said range drive gear.

* * * * *